(12) United States Patent
Anderson et al.

(10) Patent No.: US 11,491,894 B2
(45) Date of Patent: Nov. 8, 2022

(54) VEHICLE POWER PLANT TO CONSERVE WATER

(71) Applicant: Anderson Industries, LLC, Webster, SD (US)

(72) Inventors: Kory Anderson, West Fargo, ND (US); Daniel Ewert, Lake Park, MN (US); Joel Jorgenson, Fargo, ND (US)

(73) Assignee: Anderson Industries, LLC, Webster, SD (US)

( * ) Notice: Subject to any disclaimer, the term of this patent is extended or adjusted under 35 U.S.C. 154(b) by 307 days.

(21) Appl. No.: 16/414,047

(22) Filed: May 16, 2019

(65) Prior Publication Data
US 2019/0351784 A1   Nov. 21, 2019

Related U.S. Application Data

(60) Provisional application No. 62/673,639, filed on May 18, 2018.

(51) Int. Cl.
*H01M 8/04291* (2016.01)
*B60L 58/33* (2019.01)
*H01M 8/04828* (2016.01)

(52) U.S. Cl.
CPC ......... *B60L 58/33* (2019.02); *H01M 8/04828* (2013.01); *H01M 2250/20* (2013.01)

(58) Field of Classification Search
CPC ............... H01M 8/04; H01M 8/04156; H01M 8/04164; H01M 8/04291; H01M 8/04828; H01M 8/04843; B60L 50/70
See application file for complete search history.

(56) References Cited

U.S. PATENT DOCUMENTS

| | | | | |
|---|---|---|---|---|
| 6,432,568 | B1 * | 8/2002 | Salvador | H01M 8/04302 429/423 |
| 8,720,620 | B1 | 5/2014 | Bossard | |
| 2001/0049038 | A1 * | 12/2001 | Dickman | H01M 8/04768 429/423 |
| 2002/0025460 | A1 * | 2/2002 | Horiguchi | H01M 8/04225 429/409 |
| 2002/0132143 | A1 * | 9/2002 | Itou | H01M 8/04126 429/2 |

(Continued)

FOREIGN PATENT DOCUMENTS

| | | | | |
|---|---|---|---|---|
| JP | H0963612 A | * | 3/1997 | ............. Y02E 60/50 |
| RU | 2411380 | | 2/2011 | |
| RU | 123675 | | 1/2013 | |

OTHER PUBLICATIONS

Ikeda et al. JP H0963612A. Mar. 7, 1997. English translation by EPO. (Year: 1997).*

(Continued)

*Primary Examiner* — James Lee
(74) *Attorney, Agent, or Firm* — Womble Bond Dickinson (US) LLP

(57) ABSTRACT

A vehicle powered by a fuel cell power plant to conserve water includes a fuel cell to generate electricity and at least one of water or water vapor. The vehicle further includes one or more electric motors operatively coupled to the fuel cell to receive the electricity and propel the vehicle and an auxiliary system operatively coupled to the fuel cell to utilize the at least one of the water or water vapor generated by the fuel cell.

20 Claims, 4 Drawing Sheets

(56) References Cited

U.S. PATENT DOCUMENTS

| | | |
|---|---|---|
| 2004/0060312 A1* | 4/2004 | Horn ................ B60H 1/00428 |
| | | 62/244 |
| 2005/0126195 A1 | 6/2005 | Horn et al. |
| 2006/0144625 A1 | 7/2006 | Nomura et al. |
| 2010/0183944 A1 | 7/2010 | Ogawa et al. |
| 2013/0189594 A1* | 7/2013 | Breit ................ H01M 8/04164 |
| | | 429/410 |
| 2015/0188171 A1 | 7/2015 | Boodaghians et al. |
| 2017/0088010 A1* | 3/2017 | Tonks ..................... B60K 1/04 |
| 2017/0271701 A1* | 9/2017 | Berlowitz ............ H01M 8/141 |
| 2020/0340624 A1* | 10/2020 | Justin ...................... F17C 7/00 |

OTHER PUBLICATIONS

Transmittal of International Preliminary Report on Patentability for PCT/US2019/032899, dated Dec. 3, 2020, filed May 17, 2019, pp. 6.

Transmittal of the International Search Report and Written Opinion of the International Searching Authority for PCT/US2019/032899, dated Aug. 29, 2019, filed May 17, 2019, pp. 6.

* cited by examiner

VEHICLE POWER PLANT TO CONSERVE WATER

CROSS REFERENCE TO RELATED APPLICATIONS

This application claims the benefit of U.S. Provisional Patent Application No. 62/673,639, filed on May 18, 2018, the disclosure of which is incorporated herein by reference in its entirety.

TECHNICAL FIELD

Aspects and implementations of the present disclosure relate to a vehicle power plant and, in particular, a vehicle power plant to conserve water.

BACKGROUND

A vehicle uses a power plant, such as an internal combustion engine, to burn fuel, creating emissions, heat and output rotational power. The output rotational power is provided to a drivetrain and used to propel the vehicle. Vehicles can include other auxiliary systems, such as sprayers and concrete mixers, that require water to operate.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1:
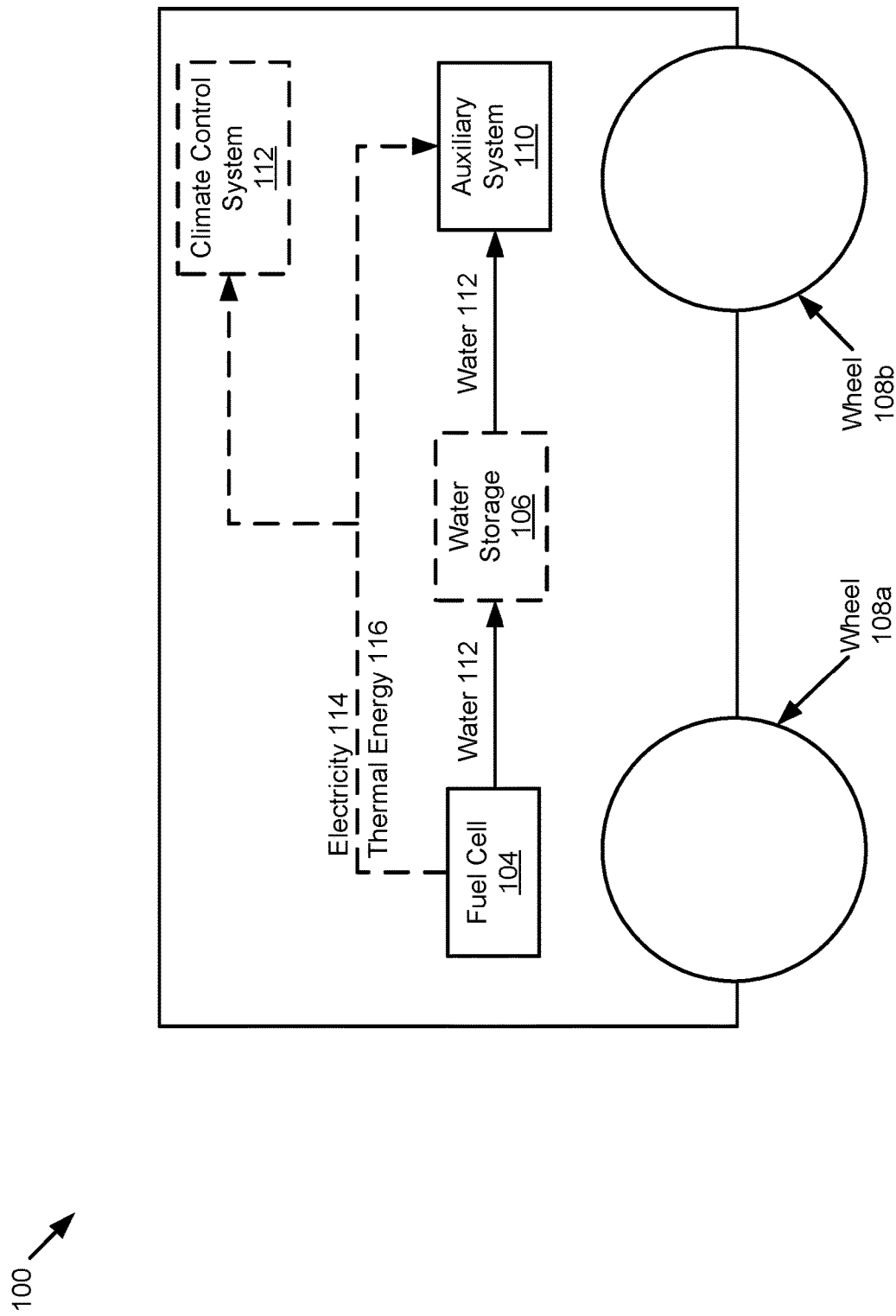
FIG. 1 is a cross section of a vehicle including a vehicle power plant to conserve water in accordance with embodiments of the disclosure.

Aspects and implementations of the present disclosure are directed to a vehicle including a fuel cell power plant to conserve water. A reaction within the fuel cell may convert a hydrogen fuel into the byproducts of electricity, thermal energy (e.g., heat) and water/water vapor. Certain vehicles require a supply of fresh water for their operation. These vehicles usually employ internal combustion engines as part of the power plant design, completely separating the power plant system and the fresh water supply system. Embodiments of the present disclosure replace the internal combustion engine, drivetrain, and linkages with a fuel cell system that generates electricity for the propulsion systems and creates water for the fresh water demands. Linking the two systems provides for the highest efficiencies possible for vehicle operation.

A variety of agricultural and industrial vehicles require a supply of fresh water as part of their function. In an agricultural setting, sprayers combine fresh water with herbicides, insecticides, and/or pesticides to promote crop production. In industrial and construction settings, concrete mixers require fresh water to ensure the concrete does not set during transportation and for cleaning after the delivery of concrete to the job site. In commercial settings, an ice resurfacer requires fresh water to provide layers of water to fill grooves in sheet of ice.

In conventional vehicles, the fresh water supply is completely separated from the power plant and transmission. The power plant and transmission is most likely an internal combustion engine, with a set of gears to provide power and propulsion. Although significant improvements have happened over the past decades to improve efficiencies, increase power output, and lower particle emissions, the basic structure for power plant and transmission have remained unchanged since the first production of these designs.

A new approach may be used that combines two disparate functions that radically improves efficiencies, increases power, and reduces emissions. Replacing the internal combustion engine with a fuel cell structure, combined with a fuel reformer and electric motors, is a more cost effective, energy effective, and environmentally friendly approach to provide propulsion for these vehicles. In addition, the exhaust of the fuel cell is fresh water, which may be captured and retained on the vehicle to be used as an input to the fresh water supply required during operation.

Internal combustion engines burn fuel, creating emissions, heat, and output rotational power. Each of these factors (exhaust emissions, heat, and output rotational power) are approximately equal with respect to the energy content. Alternately stated, approximately one-third of the energy produced by the combustion process is exhausted, one-third of the energy produced by the combustion process creates radiant heat, and one-third of the energy produced by the combustion process creates rotational output power. In application such as the vehicles under consideration, the radiant heat and exhaust are not useful, and the overall efficiency of the internal combustion engine, comparing output rotational power to the energy consumed by combustion, is approximately one-third.

Fuel cells are inherently different from internal combustion engines in the creation of power from a fuel source. Instead of a combustion process, fuel cell produce output power via a process that combines a hydrogen fuel and atmospheric oxygen to produce electricity, with the byproducts of heat and water. The water that is produced may immediately have the purity needed for the fresh water supply, or it may be filtered to remove particulates to produce the required purity for the fresh water supply.

The hydrogen fuel supply may be provided to the fuel cell in multiple fashions. In the most direct fashion, the hydrogen is produced remotely and stored on the vehicle using compressed gas cylinders. In an embodiment, the hydrogen fuel supply is produced locally, using a reforming process to convert a liquid hydrocarbon fuel supply to pure hydrogen for the fuel cell combination process. The process of converting a liquid hydrocarbon based fuel to hydrogen and converting the hydrogen to electricity (the form for output power) has an overall efficiency of approximately 50%, considerably higher than the output power efficiency of an internal combustion engine.

The electricity produced by the fuel cell is used to power electric motors that may indirectly or directly drive the wheels of the vehicle for propulsion. The control of each wheel (and therefore, the control of the vehicle movement) may be accomplished with drive-by-wire technologies, that modulate the motor output at each wheel. The output electrical power is also available to charge battery packs and to indirectly or directly power vehicle functions, such as monitoring equipment, operator control systems, pumps, motors, actuators, switches, sensors, radios, or other electrical and/or electronic devices.

The advantage of using a fuel reformer/fuel cell propulsion system compared to an internal combustion engine propulsion system is the improvement in efficiency of fuel to produce output power, and the production of water to be used in fresh water systems. For agricultural spray applications, the local production of fresh water may allow smaller tanks to be used on the vehicle, and may result in less consumption of fresh water from local wells, aquifers, or water supplies. For agricultural areas where water use is a concern, the ability for a sprayer or concrete mixer to perform required operations at a lower consumption rate of water use is highly preferential.

Furthermore, in applications where the vehicle may operate within a confined space, the reduction of emissions produces an additional advantage over conventional internal combustion engine power plants. For example, an ice resurfacer may operate in an ice rink located in a confined space with minimal ventilation. The increased emissions of an internal combustion engine could present a health hazard to people located in the confined space. A vehicle with a fuel cell power plant and lower emissions may reduce the potential health hazards to the people located in the confined space.

FIG. 1 is a cross section of a vehicle 100 including a fuel cell power plant to conserve water, in accordance with embodiments of the disclosure. In embodiments, the vehicle may be an automobile, a sport utility vehicle (SUV), a truck, a boat/sea vessel, a drone, an all-terrain vehicle (ATV), an ice resurfacer, a recreational vehicle (RV), a trailer or the like.

In embodiments, vehicle 100 may include wheels 108a and 108b that are operatively coupled to one or more electric motors (not shown) to propel the vehicle 100. Although illustrated as having wheels 108a and 108b, in some embodiments, vehicle 100 may include tracks (e.g., tank treads) instead of wheels 108a and 108b.

Vehicle 100 further includes a fuel cell 104. As previously described, fuel cell 104 converts energy from a hydrogen fuel through an electrochemical reaction of the fuel with oxygen or another oxidizing agent. The fuel cell can include an anode, an electrolyte and a cathode. At the anode a catalyst oxidizes the fuel, turning the fuel into positively charged ions and negatively charged electrons. The positively charged ions pass through the electrolyte, while the negatively charged electrons cannot pass through the electrolyte. The negatively charged electrons travel through a wire to create electric current. The negatively charged electrons are then reunited with the positively charged ions at the cathode, where the negatively charged electrons react with the positively charges ions to produce water vapor and heat. Various types of fuel cells may be used in various embodiments of the present disclosure depending on a type of fuel of the fuel source. Examples of types of fuel cells that may be used include, but are not limited to, proton exchange membrane fuel cells (PEMFCs), phosphoric acid fuel cells (PAFCs), solid acid fuel cells (SAFCs), alkaline fuel cells (AFC), solid oxide fuel cells (SOFCs), molten carbonate fuel cells (MCFCs) and electric storage fuel cells. The reaction within the fuel cell 104 produces the byproducts of water 112 (and/or water vapor), electricity 114 and thermal energy 116.

In embodiments, vehicle 100 may include a water storage 106 for storage of the water 112 produced by fuel cell 104. The water storage 106 may be a storage tank operatively coupled to the fuel cell 104 to receive the water 112 byproduct of the reaction within the fuel cell 104. In some embodiments, the water storage 106 may also receive and store water from an external water supply to supplement the water 112 generated by fuel cell 104. In an embodiment, vehicle 100 may not include water storage 106 and the water 112 from the fuel cell 104 may be provided directly to auxiliary system 110.

Vehicle 100 may include one or more auxiliary systems 110 that utilize the water 112 byproduct of the fuel cell 104. The auxiliary system 110 may be operatively coupled to the water storage 106 and/or the fuel cell 104. The auxiliary system 110 may receive water 112 from the water storage 106 or fuel cell 104 for use by the auxiliary system 110. In some embodiments, in addition to the water 112, the auxiliary system 110 may receive electricity 114 and/or thermal energy 116 from the fuel cell 104 for utilization by the auxiliary system 110.

In one embodiment, the auxiliary system 110 may be a spraying system. The spraying system may combine water 112 with herbicides, insecticides, and/or pesticides and spray the mixture to promote crop production. The spraying system may include a mixing tank where the water 112 is combined with the herbicides, insecticides, etc. In some embodiments, the thermal energy 116 may be utilized by the spraying system to heat the mixing tank and/or water 112 to improve the concentrations of additives (e.g., herbicides, insecticides, etc.) in the mixture that is to be sprayed. In embodiments, the electricity 114 may be provided to a heating system to heat the mixing tank and/or water 112. Examples of spraying systems that may be utilized in embodiments of the disclosure include, but are not limited to, boom sprayers, boomless spray nozzles, mist sprayers, three-point hitch sprayers, truck bed sprayers, towing sprayers and ATV sprayers.

In some embodiments, the auxiliary system 110 may be a concrete mixing system. The concrete mixing system may receive the water from water storage 106 and/or fuel cell 104 and utilize the water 112 to combine cement, aggregate and water to form concrete. The concrete mixing system may further utilize water 112 to ensure the concrete does not set during transportation and for cleaning after the delivery of concrete to the job site. The concrete mixing system may include a drum for storing the cement. The interior of the drum may include a spiral blade that either forces the concrete to the bottom of the drum or forces the concrete out of the drum based on the direction of rotation of the drum. The concrete mixing system may also include an electric motor to drive the rotation of the drum and one or more pumps to pump the concrete to a desired location. In embodiments, the electricity 114 generated by fuel cell 104 may be provided to the components (e.g., electric motor, pumps, etc.) of the concrete mixing system to power the components.

In embodiments, the auxiliary system 110 may be an ice resurfacing system. The ice resurfacing system may receive the water 112 from the water storage 106 and/or fuel cell 104 and utilize the water 112 to fill grooves in a sheet of ice. The ice resurfacing system may include a snow container, a hot water tank, a wash water tank, a conditioner and a board brush. The conditioner may be a weighted device that includes a sharp blade to shave off the top layer of a sheet of ice. The conditioner may also include a horizontal auger to collect the shavings of ice and provide the shavings to a vertical auger of the conditioner. The vertical auger may then carry the shavings upwards to the snow container. The conditioner may be raised and lowered using a hydraulic or motor system.

Water from the wash water tank may be sprayed on the ice surface via one or more nozzles positioned in front of the blade of the conditioner to remove any debris from the ice surface. After the conditioner, a layer of hot water from the hot water tank is applied to the sheet of ice to fill any grooves remaining in the sheet of ice. In embodiments, in addition to providing the water 112 to the ice resurfacing system, the fuel cell 104 may also provide electricity 114 and/or thermal energy 116 to the various components of the ice resurfacing system. For example, electricity 114 may be used to power the hydraulics/motor system and other components of the conditioner. In another example, electricity 114 and/or thermal energy 116 may be used to heat the water stored in the hot water tank.

In some embodiments, the auxiliary system 110 may be one or more systems associated with an RV or trailer designed for accommodation. The auxiliary system 110 may include systems associated with sleeping quarters, cooking facilities, bathroom facilities, climate control systems, water heating systems, entertainment systems, electrical systems, etc. of the RV/trailer. The systems associated with the RV may utilize the water 112, thermal energy 116 and/or electricity 114 generated by fuel cell 104. For example, the water 112 may be used for cooking and bathroom facilities of the RV. In another example, the thermal energy 116 and/or electricity 114 may be provided to a climate control system of the RV. In some embodiments, water 112 may be provided to a humidifying system of the RV to humidify the air in the RV. In embodiments, one or more of the water 112, thermal energy 116 or electricity 114 may be utilized by any number of systems of the RV/trailer in any combination.

In an embodiment, the auxiliary system 110 may be a street washer system (e.g., a street sweeper). The street washer system may include a water tank and sprayers to loosen particles and reduce dust. The street washer system may further include one or more brooms to gather debris into a main collection area. A vacuum then collects the debris from the main collection area and deposits the debris in a collection bin or hopper. The street washer system may utilize the water 112, thermal energy 116 and/or electricity 114 generated by fuel cell 104. For example, the street washer system may store the water 112 in the water tank and spray the water 112 to loosen the particles and debris. In another example, the electricity 114 may be used to power the brooms, vacuum and/or other various components of the street washer system.

In some embodiments, vehicle 100 may include a climate control system 118. The climate control system 118 may include heating and/or air conditioning systems that can maintain a desired climate within a cabin (not shown) of vehicle 100. The electricity 114 and/or thermal energy 116 may be provided to the climate control system 118 of the vehicle to enable to climate control system to maintain the desired climate within the cabin of vehicle 100.

In embodiments, electricity 114 generated by fuel cell 104 may be used to power other systems of vehicle 100. For example, electricity 114 may be used charge battery packs or to indirectly or directly power vehicle functions, such as monitoring equipment, operator control systems, pumps, motors, actuators, switches, sensors, radios, or other electrical and/or electronic devices.

Figure 2:
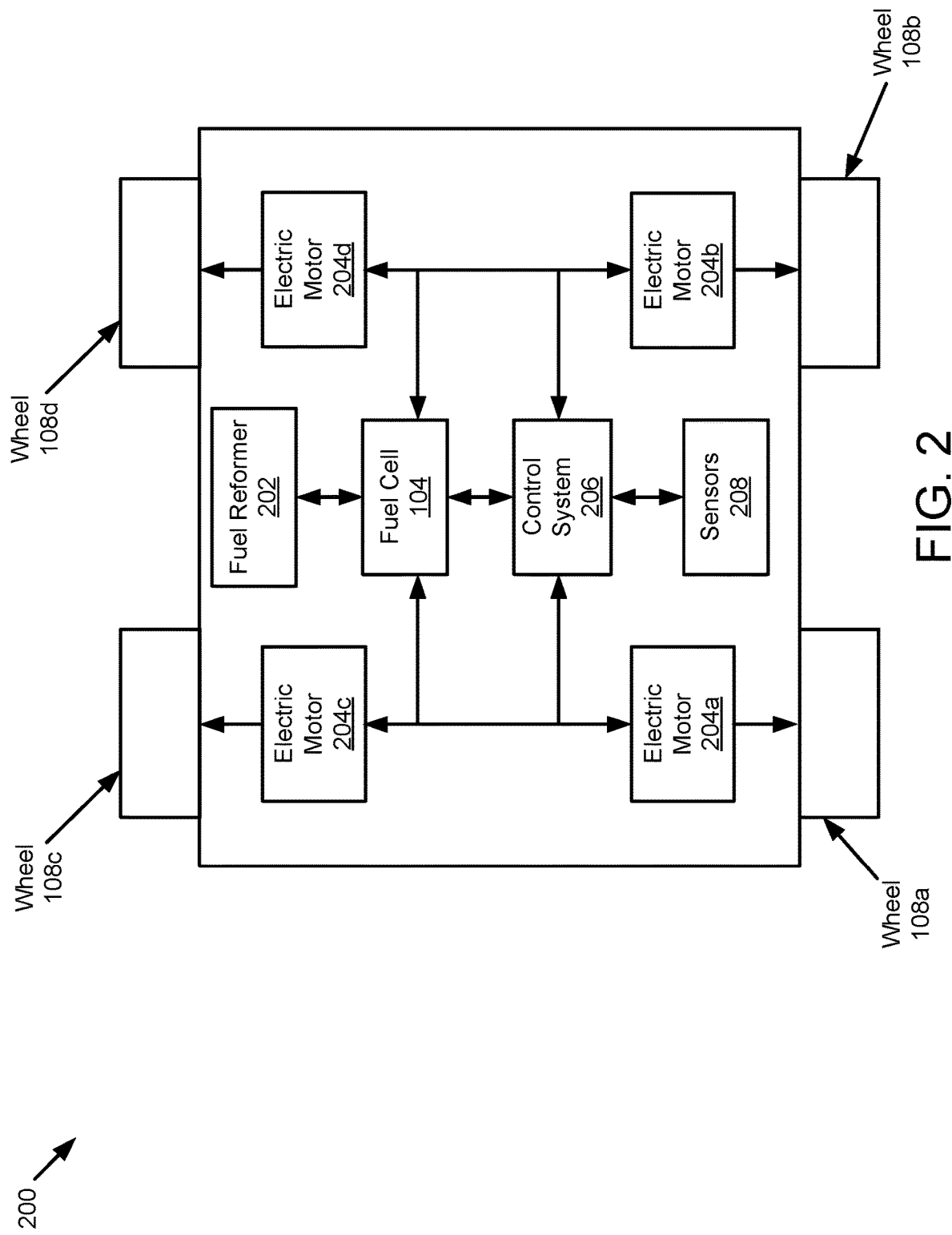
FIG. 2 is a top-down view of a vehicle including a fuel cell power plant in accordance with embodiments of the disclosure.

FIG. 2 is a top-down view of a vehicle 200 including a fuel cell power plant in accordance with embodiments of the disclosure. Vehicle 200 may correspond to vehicle 100 as previously described at FIG. 1. Vehicle 200 may include electric motors 204a-d, one or more sensors 208, a fuel cell 104 power source, a fuel reformer 202 and a control system 206.

Electric motors 204a-d may be coupled to wheels 108a-d, respectively, to propel vehicle 200. Although illustrated as having one electric motor driving each wheel of vehicle 200, in embodiments vehicle 200 may have more or less electric motors. For example, vehicle 200 may have a first electric motor driving wheels 108a and 108b and a second electric motor driving wheels 108c and 108d. Electric motors 204a-d may be operatively coupled to fuel cell 104 to receive electricity generated by the fuel cell 104. Electric motors 204a-d may also be coupled to control system 206 to send and/or receive data from control system 206. In embodiments, vehicle 200 may include one or more motor controllers (not shown) operatively to the electric motors 204a-d to receive electric power from the fuel cell 104 and convert the electric power into an adjustable frequency to enable speed control of the electric motors 204a-d.

Vehicle 200 may include a fuel reformer 202 that is operatively coupled to fuel cell 104. The fuel reformer 202 converts a conventional hydrocarbon fuel source, such as diesel, gasoline, methanol, ethanol, aviation fuel, jet fuel, kerosene or similar hydrocarbons into pure hydrogen fuel. The hydrogen fuel may then be provided to fuel cell 104.

Vehicle 200 may include one or more sensors 208 operatively coupled to control system 206. The one or more sensors 208 may acquire information associated with vehicle 200 and generate signals based on the information. The generated signals are then provided to the control system 206 for analysis. In embodiments, the one or more sensors 208 may include one or more ultrasonic sensors that measure the distance from vehicle 200 to objects by transmitting and receiving ultrasonic signals. In some embodiments, the one or more sensors 208 may include an inertial mass unit (IMU) that includes accelerometers, gyroscopes and/or magnetometers to measure the vehicle's 200 specific force, angular rate and/or magnetic field. In an embodiment, the one or more sensors 208 may include one or more cameras for recording visual images of the surroundings of vehicle 200.

In embodiments, the one or more sensors 208 may include a global positioning system (GPS) sensor that utilizes a satellite-based navigation system to acquire geographic position, velocity and timing information associated with vehicle 200. In some embodiments, the one or more sensors 208 may acquire information associated with the components of vehicle 200. For example, the one or more sensors 208 may be used to monitor the water level of a water storage, the operational status of auxiliary systems and components of auxiliary systems, fuel levels, etc. In embodiments, the one or more sensors 208 may include any type of sensor capable of acquiring information associated with the vehicle 200.

The control system 206 includes a processing device configured to receive and monitor signals received from the fuel cell 104, the one or more sensors 208 and/or electric motors 204a-d. The control system 206 may receive commands via a user interface corresponding to one or more actions to be performed by vehicle 200. The control system 206 may provide commands to the fuel cell 104 to adjust the power output of the fuel cell 104. The control system 206 may provide commands to electric motors 204a-d or a motor controller of electric motors 204a-d to adjust the speed of one or more of electric motors 204a-d. The control system 206 may provide commands to auxiliary systems (not shown) of vehicle 200.

Figure 3:
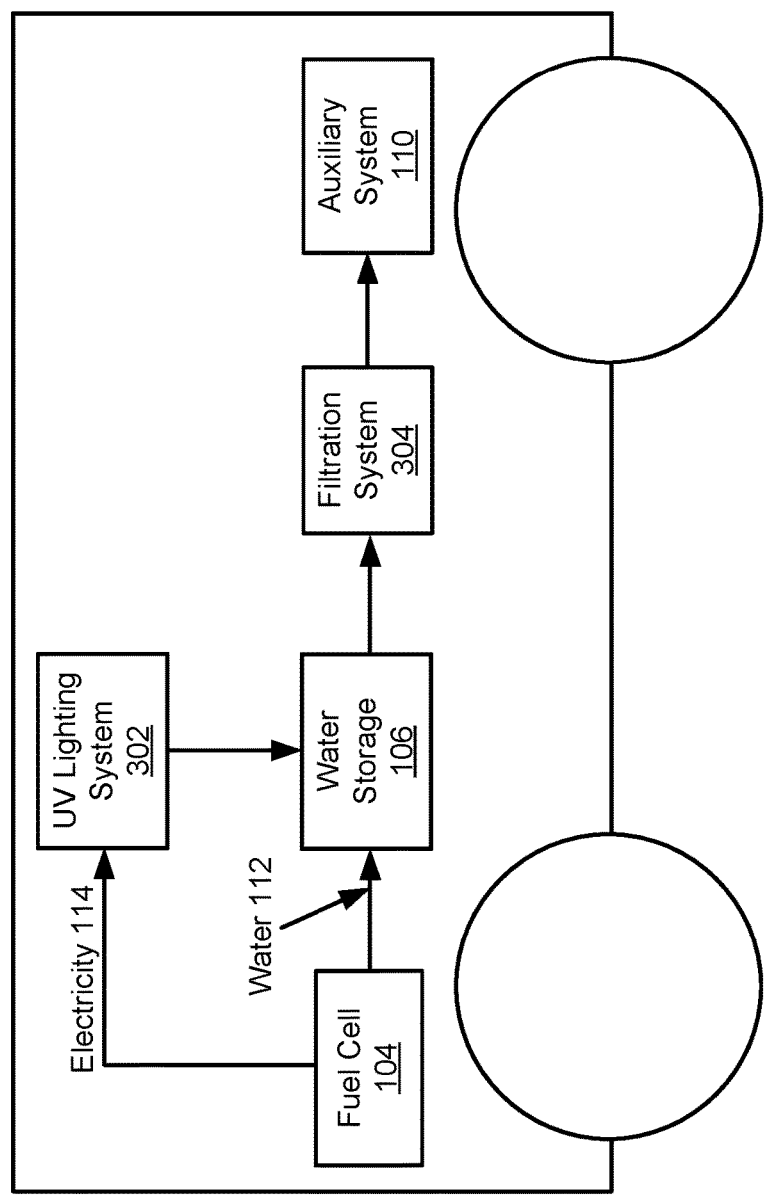
FIG. 3 is an illustration of an example of a vehicle including a fuel cell power plant and sterilization and decontamination systems in accordance with embodiments of the disclosure.

FIG. 3 is an illustration of an example of a vehicle 300 including a fuel cell power plant and sterilization and decontamination systems in accordance with embodiments of the disclosure. Vehicle 300 may correspond to vehicles 100 or 200 as previously described at FIGS. 1 and 2, respectively. Vehicle 300 may include a fuel cell 104, water storage 106, an ultraviolet (UV) lighting system 302, a filtration system 304 and an auxiliary system 110.

For certain types of auxiliary systems 110, particles and/or contaminates in water 112 may need to be removed before the water 112 may be used by the auxiliary system 110. Accordingly, in some embodiments, vehicle 300 may include a UV lighting system 302 and/or filtration system 304.

The UV lighting system 302 may be operatively coupled to the fuel cell 104. The UV lighting system 302 may be an ultraviolet germicidal irradiation system that uses short-wavelength (e.g., between 230-280 nanometers) UV light to kill or inactivate microorganisms. The UV lighting system 302 may include one or more lamps or light emitting diodes (LEDs) to generate the UV light using the electricity 114 from the fuel cell 104. The UV lighting system 302 may direct the UV light towards water 112 generated by fuel cell 104 to sterilize the water 112. In embodiments, the UV lighting system 302 may sterilize the water 112 generated by the fuel cell 104 while the water 112 is stored in water storage 106. In other embodiments, the UV lighting system 302 may sterilize the water 112 as the water is being provided to the water storage 106, the filtration system 304 and/or the auxiliary system 110.

The filtration system 304 may be operatively coupled to the water storage 106 or, in embodiments that do not include a water storage 106, to the fuel cell 104. The filtration system 304 may remove impurities from the water 112 generated by the fuel cell 104 using physical barriers, chemical processes or biological processes. The filtration system 304 may receive the water 112 from the water storage 106 or fuel cell 104 and provide filtered water 112 to the auxiliary system 110. Examples of filtration systems 304 that may be utilized in vehicle 300 include, but are not limited to, granular-activated carbon filters, depth filters, metallic alloy filters, microporous ceramic filters, carbon block resin filters or microfiltration/ultrafiltration membranes.

It should be noted that the components and configuration of vehicle 300 are shown for illustrative purposes and embodiments of the disclosure may utilize any combination of components and configurations as previously described in FIGS. 1-3. In some embodiments, vehicle 300 may include a UV lighting system 302, but may not include a filtration system 304. In other embodiments, vehicle 300 may include a filtration system 304, but may not include a UV lighting system 302. In embodiments, filtration system 304 may be operatively coupled between fuel cell 104 and water storage 106 so that the filtration system 304 filters water 112 prior to storage of the water 112 at water storage 106. In an embodiment, vehicle 300 may include other systems to sterilize, decontaminate or treat the water 112 generated by fuel cell 104.

Figure 4:
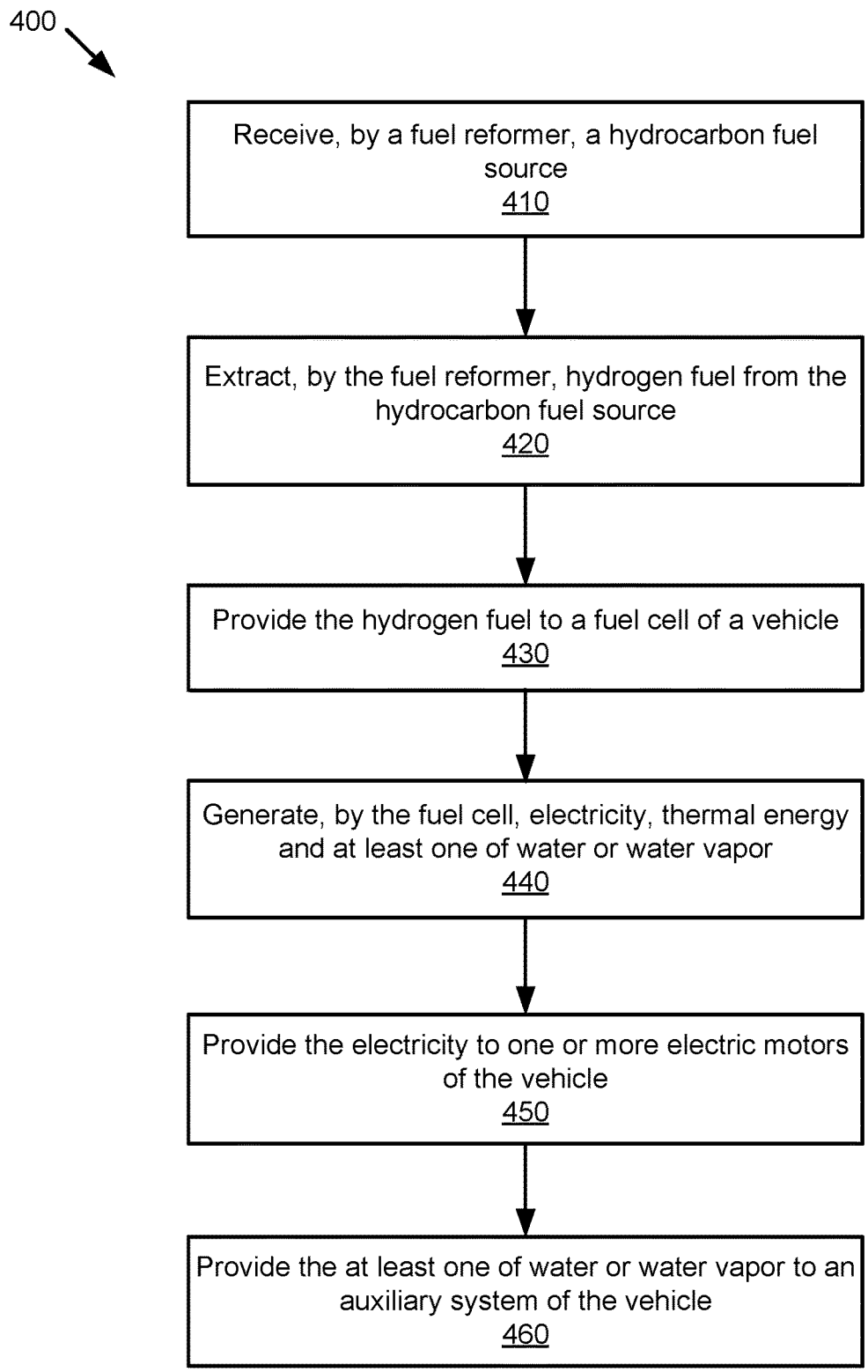
FIG. 4 depicts a flow diagram of a method for conserving water by a vehicle including a fuel cell power plant in accordance with embodiments of the disclosure.

FIG. 4 depicts a flow diagram of a method 400 for conserving water by a vehicle including a fuel cell power plant in accordance with embodiments of the disclosure. In embodiments, various portions of method 400 may be performed by one or more components of vehicle 100, 200 and/or 300 of FIGS. 1-3, respectively.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

At block 410, a fuel reformer of the vehicle receives a hydrocarbon fuel source. Examples of hydrocarbon fuel sources may include diesel, gasoline, methanol, ethanol, aviation fuel, jet fuel, kerosene or other similar hydrocarbon fuel sources.

At block 420, the fuel reformer extracts hydrogen fuel from the hydrocarbon fuel source.

At block 430, the fuel reformer provides the hydrogen fuel to a fuel cell of the vehicle.

At block 440, the fuel cell generates electricity, thermal energy and at least one of water or water vapor as byproducts of the reaction within the fuel cell.

At block 450, the electricity is provided from the fuel cell to one or more electric motors of the electric vehicle that is operatively coupled to the fuel cell.

At block 460, the at least one of water or water vapor generated by the fuel cell is provided to an auxiliary system of the vehicle that is operatively coupled to the fuel cell. In embodiments, the electricity and/or thermal energy generated by the fuel cell may be provided to one or more components of the auxiliary system. In some embodiments, the electricity, thermal energy and/or water generated by the fuel cell may be provided to other systems of the vehicle.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A vehicle powered by a fuel cell power plant to conserve water, comprising:
    a fuel cell to generate electricity and water;
    one or more electric motors operatively coupled to the fuel cell to receive the electricity and propel the vehicle;
    an auxiliary system operatively coupled to the fuel cell to utilize the water generated by the fuel cell; and
    a water storage operatively coupled to the fuel cell and the auxiliary system, wherein the water storage is configured to receive the water from the fuel cell and to provide the water generated by the fuel cell to the auxiliary system;
    wherein the auxiliary system comprises a spraying system configured to spray the water from the water storage into an environment outside of the vehicle.

2. The vehicle of claim 1, further comprising:
    a fuel reformer operatively coupled to the fuel cell, the fuel reformer to extract hydrogen fuel from a hydrocarbon fuel and provide the hydrogen fuel to the fuel cell.

3. The vehicle of claim 1, further comprising:
    a control system comprising a processing device operatively coupled to the fuel cell, the one or more electric motors and the auxiliary system, the control system to control one or more parameters of the vehicle.

4. The vehicle of claim 1, further comprising:
    a filtration system operatively coupled between the fuel cell and the auxiliary system, the filtration system to filter the water generated by the fuel cell and provide the filtered water to the auxiliary system.

5. The vehicle of claim 1, further comprising:
    an ultraviolet (UV) lighting system operatively coupled to the fuel cell, the UV lighting system to receive electricity from the fuel cell and generate UV light to sterilize the water generated by the fuel cell.

6. The vehicle of claim 1, wherein the fuel cell generates thermal energy and wherein the thermal energy is provided to the auxiliary system.

7. The vehicle of claim 1, wherein the auxiliary system comprises an ice resurfacing system and the spraying system is to spray water on ice to fill grooves in the ice.

8. The vehicle of claim 1, wherein the auxiliary system comprises a street washing system and the spraying system is to spray water to loosen particles and reduce dust.

9. The vehicle of claim 1, wherein the auxiliary system comprises a mixing tank to mix the water generated by the fuel cell with an herbicide, an insecticide, or a pesticide to form a mixture, wherein the spraying system is to spray the mixture.

10. The vehicle of claim 1, wherein the water generated by the fuel cell is at least partially in the form of a vapor when generated.

11. A method of conserving water in a power plant of a vehicle, the method comprising:
    generating, by a fuel cell of the vehicle, electricity and water;
    providing the electricity to one or more electric motors operatively coupled to the fuel cell;
    providing the water generated by the fuel cell to a water storage operatively coupled to the fuel cell and an auxiliary system;
    storing the water generated by the fuel cell at the water storage; and
    providing the water generated by the fuel cell to the auxiliary system;
    wherein the auxiliary system comprises a spraying system configured to spray the water generated by the fuel cell from the water storage into an environment outside of the vehicle.

12. The method of claim 11, further comprising:
    receiving, by a fuel reformer of the vehicle, a hydrocarbon fuel source;
    extracting, by the fuel reformer, hydrogen fuel from the hydrocarbon fuel source; and
    providing, to the fuel cell, the hydrogen fuel, wherein the fuel cell generates the electricity and the water in response to receiving the hydrogen fuel from the fuel reformer.

13. The method of claim 11, wherein providing the water generated by the fuel cell to the auxiliary system comprises:
    providing the water generated by the fuel cell to a filtration system;
    filtering, by the filtration system, the water generated by the fuel cell; and
    providing the filtered water to the auxiliary system.

14. The method of claim 11, wherein providing the water generated by the fuel cell to the auxiliary system comprises:
    providing the electricity to an ultraviolet (UV) lighting system operatively coupled to the fuel cell of the vehicle;
    sterilizing the water generated by the fuel cell using UV light generated by the UV lighting system; and
    providing the sterilized water to the auxiliary system.

15. The method of claim 11, wherein the fuel cell of the vehicle generates thermal energy, the method further comprising:

providing the thermal energy to the auxiliary system operatively coupled to the fuel cell.

16. The method of claim 11, further comprising:

receiving, by a control system from one or more sensors of the vehicle, information associated with the vehicle; and adjusting, by the control system, one or more operational parameters associated with the fuel cell, the one or more electric motors or the auxiliary system of the vehicle based on the information.

17. The method of claim 11, wherein providing the water generated by the fuel cell to the auxiliary system comprises providing the water generated by the fuel cell to a mixing tank to mix the water generated by the fuel cell with an herbicide, an insecticide, or a pesticide.

18. The method of claim 11, wherein the auxiliary system comprises an ice resurfacing system, the method further comprising operating the spraying system to spray the water generated by the fuel cell on the ice to fill grooves in the ice.

19. The method of claim 11, wherein the auxiliary system comprises a street washing system, the method further comprising operating the spraying system to spray the water generated by the fuel cell to loosen particles and reduce dust.

20. The method of claim 11, wherein the water generated by the fuel cell is at least partially in the form of a vapor when generated.

* * * * *